United States Patent [19]

Tischer et al.

[11] Patent Number: 4,773,298
[45] Date of Patent: Sep. 27, 1988

[54] METHOD FOR NEUTRALIZING SURFACE-LAID OR CAMOUFLAGED LAND MINES AND MOBILE UNIT FOR PERFORMING THE METHOD

[76] Inventors: Heinz Tischer; Norbert Hoogen, both of Billwerder Billdeich 603, 2050 Hamburg 80, Fed. Rep. of Germany

[21] Appl. No.: 938,704

[22] Filed: Dec. 4, 1986

[30] Foreign Application Priority Data

Dec. 4, 1985 [DE] Fed. Rep. of Germany ....... 3542787

[51] Int. Cl.⁴ .......................... F41H 11/16; B66C 1/06
[52] U.S. Cl. ........................................ 89/1.13; 89/1.1; 89/1.11
[58] Field of Search ........................ 89/1.13, 1.11, 1.1

[56] References Cited

U.S. PATENT DOCUMENTS

| 3,112,669 | 12/1963 | Damblanc | 89/1.13 |
| 3,202,934 | 8/1965 | Coffee | 89/1.11 X |
| 3,946,233 | 3/1976 | Erben et al. | 89/1.11 X |
| 4,593,766 | 6/1986 | Gossard | 89/1.13 X |

FOREIGN PATENT DOCUMENTS

| 2121089 | 11/1972 | Fed. Rep. of Germany | 89/1.13 |
| 2363557 | 6/1975 | Fed. Rep. of Germany | 89/1.13 |
| 3219488 | 12/1983 | Fed. Rep. of Germany | 89/1.13 |
| 3335464 | 4/1985 | Fed. Rep. of Germany | 89/1.13 |
| 1119948 | 7/1968 | United Kingdom | 331/94.5 X |

OTHER PUBLICATIONS

"Directed Energy Weapons—Where Are They Headed", in Physics Today, Aug. 1983, pp. 17–20.

*Primary Examiner*—David H. Brown
*Attorney, Agent, or Firm*—Beveridge, DeGrandi & Weilacher

[57] ABSTRACT

The method makes it possible to neutralize surface-laid or camouflaged and in particular intelligent land mines, in that a focused beam of a powerful laser unit is automatically or manually systematically guided over the surface to be cleared of land mines in a grid pattern, the movement sequence of the laser beam being program controlled, so that the laser beam in computer-assisted manner locates the laid mines both systematically in the SCAN process and also in planned manner and neutralizes or detonates them by introducing energy.

9 Claims, 1 Drawing Sheet

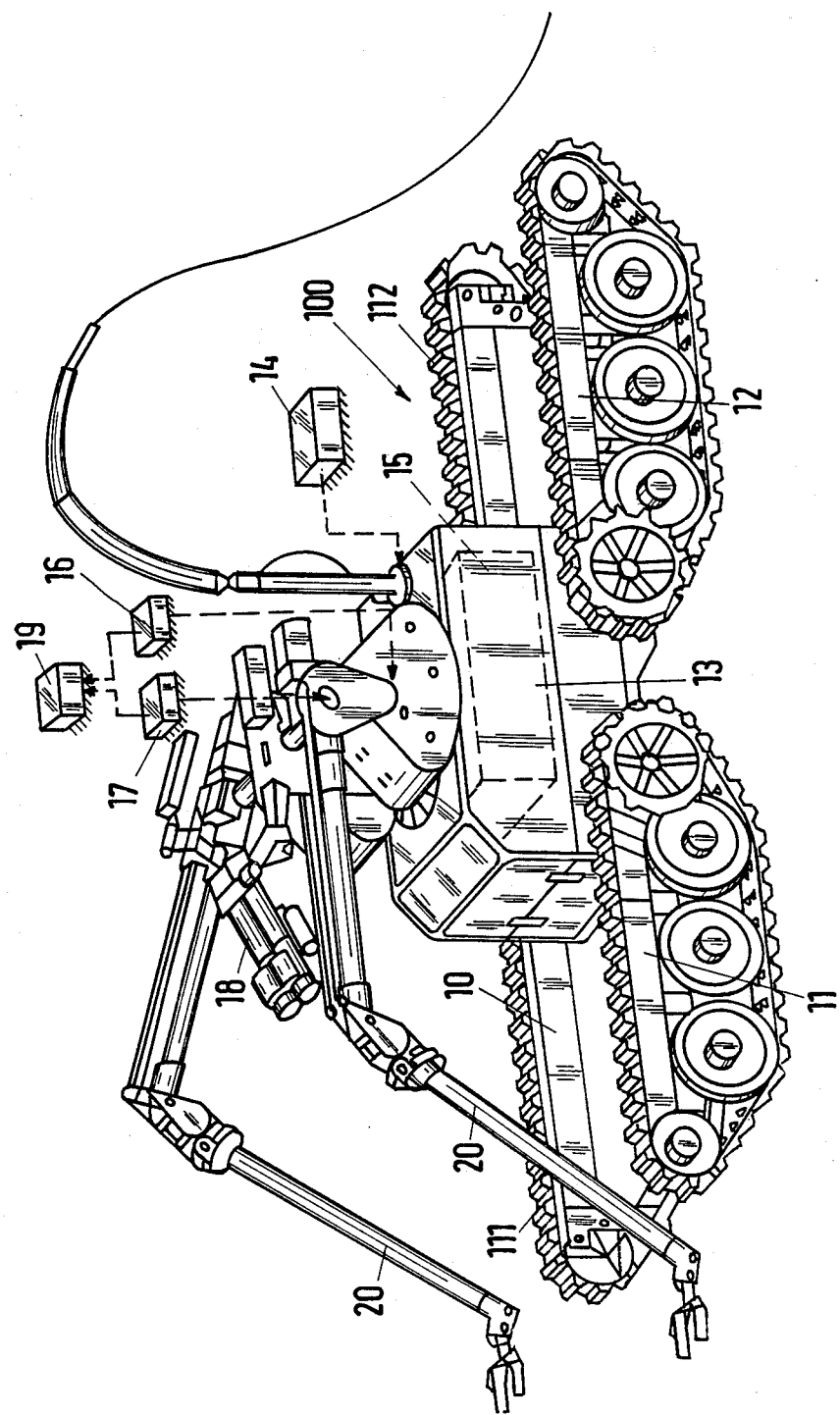

METHOD FOR NEUTRALIZING SURFACE-LAID OR CAMOUFLAGED LAND MINES AND MOBILE UNIT FOR PERFORMING THE METHOD

BACKGROUND OF THE INVENTION

The present invention relates to a method for neutralizing surface-laid or camouflaged land mines and to a mobile unit, apparatus or vehicle for performing the method.

The land mine is an active obstacle to stop, delay or render impossible movement by the other side. In future, it will continue to be an important combat support element. Not only the reliability, but also the effectiveness of mines has been improved through the use of electronics.

Different types of mechanical mine sweeping or clearing systems are known, such as mine ploughs and-/or rollers, whilst explosive mine clearing systems are also known. Traditional systems, such as e.g. explosive charges, fuses and mats are being increasingly supplemented and in part replaced by fuel—air—explosive systems (FAE-systems). The latter is able to neutralize more than 90% of all known mines with pressure detonators, but FAE-resistant mines are also known.

Modern mines are much more difficult to clear than mines having pressure detonators. An integrated digging up or removal blocking means, which if necessary can also be switched off, prevents easy cleaning. Seismic sensors prevent mines being cleared by hand. An electromagnetic field artificially produced for clearing purposes remains ineffective, if the correct alarm sensor is made to operate beforehand. Against modern mines, pyrotechnic clearing means are also not very effective, because they have a high resistance to blasting. Such sudden and powerful position changes of the type produced by detonating explosive, are absorbed by a shock blocking device fitted into land mines and consequently detonation is prevented. Mechanical clearing means, such as rollers and striking chains can only function against pressure sensors and can also destroy mines with sensor combinations, but the risk rate is high. However, these clearing means are not only very slow and clumsy, but become worn after a certain number of mine detonations. The most effective clearing method consists of removing the mined ground with the entire width of vehicle, but high technical expenditure and effort are required for this. In this clearing method soil and mines are hurled to the front and sides and consequently absolute mine-free corridors are formed. However, the clearing speed of this method is not very high. Among the most reliable, but also dangerous and time-consuming clearing methods is the use of inindividual relays charges, which are manually placed directly on or at the mine. However, this clearing procedure is completely unsuitable for the rapid overcoming of mine barriers.

Modern, so-called intelligent land mines are characterized in that they cannot be discovered or eliminated with conventional means. Such land mines are made from very difficulty detectable materials, such as e.g. nonmetals, plastics, etc and in certain cases are covered with local materials for camouflage purposes, e.g. with vegetation, soil, etc. The increasing "intelligence" of land mines, e.g. made possible through the use of microelectronics in connection with the igniting or detonating mechanism, leads to the failure of traditional mine clearing means. Surface-covering blasting with the aid of explosive fuses and mats or fuel—air—explosion systems does not always lead to the elimination of intelligent land mines.

A conventional solution to the problem would consist of firing conventional ammunition in a systematic, surface-covering manner, so as to hit each land mine and consequently detonate the same by detonating the detonating mechanism. However, such a method cannot be realised for logistic and cost reasons.

SUMMARY OF THE INVENTION

The problem of the present invention is to provide a method neutralizing surface-laid or camouflaged land mines, which is more functionally reliable, involves low operating costs, causes no additional logistic problems and assists ideas for digging up again or eliminating mines laid by your own troops, whilst simultaneously increasing the clearing capacity.

This problem is solved by the characterising features of the present invention in which a mine clearing system is provided that makes possible the neutralization of system, equipped with computer-controlled manipulators/robots, which systemically guide the focused beam of a powerful laser unit installed on the same support system systematically over the surface to be cleared (SCAN method) is suitable for rendering mines harmless from an adequate safety distance. Due to the penetration possibility of the laser beam used into the soil, it is also possible to neutralize land mines buried in the soil. It is also possible to activate explosive material with the object of allowing the latter to burn off or detonate same in a controlled manner. As a result of the systematic bombardment with a laser beam of the surface to be cleared of mines within a corresponding grid pattern, it it possible in a functionally reliable and inexpensive manner to make a corridor in a minefield though which it is possible to drive.

Apart from the task of clearing an unknown, mined sector in a minefield, it may also be necessary to again pass through areas mined by friendly troops. In conjunction with a documented mine laying procedure and specifically for the area of a potential corridor, the clearing system provides the option in a planned computer-aided manner to locate the laid mines and detonate the same. Such a procedure increases to a considerable extent the clearing capacity compared with the SCAN method. There is the further advantage that a focused laser beam can penetrate several centimeters into soil covering mines, so that even such mines can be neutralized. Soil-covered mines do not therefore constitute an obstacle which cannot be overcome by the laser beam.

The method using a laser beam can also be employed in those minefields, where in each case two mines are buried in superimposed manner in the soil. In order to be able to neutralize such mines, following the location of a mine and the detonation thereof, the focused laser beam is kept for a certain period of time in the detonation area, so as to be able to neutralize any other mine which might be located there.

For the purposes of the method, it has proved particularly advantageous to use a $CO_2$-gaslaser with several kW of continuous wave power or a pulsed neodymium-YAG laser, but other powerful laser units can also be used.

DESCRIPTION OF THE DRAWING AND PREFERRED EMBODIMENT

An embodiment of the inventive method is described in greater detail hereinafter relative to the drawing, which is a diagrammatic view of a mobile unit for neutralizing land mines.

This mobile unit 100 comprises a frame-like chassis 10, which in the embodiment shown in the drawing is provided on either side with two successively arranged chain running gears 11, 12, 111, 112, which can be driven by means of a drive mechanism (not shown), which is arranged in a unit casing 13 provided centrally in the chassis 10. If the unit casing is constructed for carrying an operator, this drive device can be operated manually. However, it is also possible to remotely steer the mobile unmanned unit by pulses, which emanate from a remote steering or control desk and which can be transferred mechanically, electromagnetically, fibre optically or acoustically. Within the mobile unit 100 to be steered, the pulses received are used for modifying the position of steering devices and it is possible to use a command steering means or localizer beams. Such a remote control device is indicated in the mobile unit at 14.

The mobile unit 100 is provided with a laser producing device 15, which can be arranged in or on unit casing 13. At 18 can be seen the laser beam exit tube, which is pivotable heightwise and sideways by means of the servomotors indicated at 16, 17 and is optionally telescopically displaceable. The pivotability can be program-controlled. A corresponding program control unit is indicated at 19. Additional gripping arms for the unit 100 are indicated at 20.

By means of the program control unit 19 and servomotors 16, 17, it is possible to guide the movement sequence of the focused beam in program-controlled manner over the area to be cleared and the computer-aided focused laser beam locates the mines laid and detonates these. A field is cleared in a given grid, so that the laser beam is guided over all parts of the field to be cleared. During the clearing process, mobile unit 100 does not perform any forward movement. However, in the case of a further clearing possibility, it is possible to incorporate the forward movement of unit 100 in the guidance of the laser beam over the surface area to be cleared of mines.

Apart from the use of a continuous laser beam during the clearing process, it is also possible to emit the laser beam in lightning-like manner, without reducing the reliability of clearance.

What is claimed is:

1. A method of neutralizing surface-laid or camouflaged land mines within an area comprising:
    generating a focused beam of laser energy,
    guiding the focused beam over the area to neutralize or detonate any land mines therein with energy from the laser beam, providing a mine-free corridor.

2. A method as claimed in claim 1 wherein the focused beam is guided over the area in a grid pattern.

3. A method as claimed in claim 1 wherein the focused beam is guided by activating a program control unit to automatically scan the area.

4. A method as claimed in claim 1 wherein the focused beam is generated by generating pulses of laser energy at given time intervals.

5. A method as claimed in claim 1 wherein the focused beam is guided by activating a computer-controlled manipulator/robot to steer the beam.

6. A method as claimed in claim 1 further comprising maintaining the focused beam in a detonation area for a period of time after a mine has been detonated in the detonation area.

7. A method as claimed in claim 1 further comprising returning the focused beam to a detonation area for a period of time after a mine has been detonated in the detonation area.

8. A method as claimed in claim 1 wherein the focused beam is generated by activating a carbon dioxide gas laser.

9. A method as claimed in claim 1 wherein the focused beam is generated by activating a pulsed neodymium-YAG laser.

* * * * *